United States Patent [19]

Mesak

[11] 3,735,015

[45] May 22, 1973

[54] COLOR FRAME LOCK CONTROL FOR SIGNAL REPRODUCING SYSTEMS

[75] Inventor: Charles Mesak, El Segundo, Calif.

[73] Assignee: Columbia Broadcasting System, Inc., New York, N.Y.

[22] Filed: Aug. 19, 1971

[21] Appl. No.: 172,982

[52] U.S. Cl...........................................178/5.4 CD

[51] Int. Cl...........................................H04n 5/78

[58] Field of Search.....................178/5.2 R, 5.4 CD, 178/5.4 SY, 69.5 F, 6.6 R, 6.6 A, 6.6 P, 6.6 SF, 6.6 TC

[56] References Cited

UNITED STATES PATENTS 3,594,498 7/1971 Smith..............................178/5.4 CD 3,461,226 8/1969 Carnt..............................178/5.4 CD

*Primary Examiner*—Robert L. Richardson

*Attorney*—Spencer E. Olson

[57] ABSTRACT

A system for causing a color video tape machine to always lock to the correct color frame in which the machine is allowed to lock up randomly and the locking characteristic examined to ascertain whether lockup has occurred on the correct or incorrect color frame. If lockup is on the correct color frame, the playback machine is allowed to function normally, but if it is incorrect, a signal is generated and applied to the capstan servo which momentarily speeds up the capstan drive motor to move the tape forward by an amount corresponding to one frame.

11 Claims, 8 Drawing Figures

INVENTOR.
CHARLES MESAK
BY
Spencer E. Olson
ATTORNEY

INVENTOR.
CHARLES MESAK

BY

ATTORNEY

PATENTED MAY 22 1973 3,735,015

INVENTOR.
CHARLES MESAK

BY

ATTORNEY

INVENTOR.
CHARLES MESAK
BY
Spencer E. Olson
ATTORNEY

COLOR FRAME LOCK CONTROL FOR SIGNAL REPRODUCING SYSTEMS

BACKGROUND OF THE INVENTION

This invention relates to magnetic recording and reproducing systems and methods, and, more particularly, to a reproducing system, and a method for such a system, for providing precise color frame lock of NTSC color television signals reproduced from magnetic tape recordings of these signals.

Among the problems of reproducing NTSC color television signals recorded on magnetic tape is that of color frame lock, particularly when the recorded program contains splices, either electronic or physical. The problem arises from the nature of the NTSC color television itself, and by the manner in which recorders in current use process the signal on playback.

The problem posed by the television signal itself will first be examined. As is known, and as used in the description to follow, the period of a color frame is four fields. As is also well known in the industry, an unmodified videotape recorder (VTR) will lock only to alternate fields. Thus, there are two possible lock up points in each color frame. More specifically, there is an exact frequency relationship between the scanning frequency and the color subcarrier frequency, namely, $F_h = (2/455)F_{sc}$, and consequently four television fields must occur before the unmodulated carrier (represented by burst) exactly repeats itself in phase with respect to horizontal sync. This is illustrated in FIG. 1 which shows two television frames, labeled Frame 1 and Frame 2, the latter being immediately adjacent in time to Frame 1. As numbered, lines 1, 2 3 . . . 262 1/2 are adjacent lines in the first field, and the lines of the second field, interlaced with those of the first, are numbered 262 1/2 to 525. Superimposed on some of the lines are simusoidal signals having a frequency of 3.58 MHz, representing the unmodulated carrier (color burst) of the composite NTSC color television signal. It will be noted that at the start of Frame 1, the first half cycle has a positive-going zero crossing, whereas in Frame 2, the first half cycle is negative-going. In that sense Frames 1 and 2 are different, and it will be evident that if a continuous signal is to be reproduced, splices must join succeeding monochrome frames in correct sequence; i.e., a Frame 2 must be joined to a Frame 1. If a Frame 1 is joined to another Frame 1, there will be an abrupt 180° shift in phase in burst and chroma signal at the splice because the signal in the second frame would be positive-going instead of having a negative-going zero crossing, as indicated in FIG. 1. It should be noted here for future reference that all reproduced signals must have the proper phase with respect to the rest of the television plant, and that the phase of the subcarrier relative to any part of the horizontal synchronizing signal is not specified. It is evident, then, that if the frame following a splice is 180° out of phase, the signal reproduced therefrom would also be 180° out of phase with the rest of the television plant, which would be timed to be working on a Frame 2. This is an obviously unacceptable condition, and videotape machines (VTR) in current use have provision for recognizing the improper phase and shifting the phase of the whole signal by half a cycle of the subcarrier to bring it back into proper phase.

Correction of the subcarrier phase errors is accomplished in currently available videotape machines by the electronic correction system shown in block diagram form in FIG. 2. The corrector basically includes an electronically variable delay line 13 for receiving the video output 11 from the VTR, and a time base error detector 14 for comparing the phase of the horizontal sysnchronizing pulses of the reproduced video signal with that of a stable reference pulse input 16, to derive an error voltage 17 proportional to the phase departures of the reproduced synchronizing pulses from the reference pulses. The error voltage is applied to a control input of the delay line 13 to vary the phase of the video signal 11 in compensatory relation to the error voltage.

The compensated output of the delay line 13 is then applied to the input of a second electronically variable delay line 18. The burst is stripped from the signal from the output of delay line 13 and its phase compared in a phase comparator 19 with that of a reference 3.58 MHz subcarrier (from which the reference sync pulses are also derived). The comparator 19 is effective to develop an error voltage output proportional to departures in the phase of the color burst of the video signal from that of the reference input. The error voltage is, in turn, applied to a control input of the delay line 18 to vary the phase of the video signal passing through the line in compensatory relation to the phase departures of the color burst. As a result, substantially exact compensation of color phase error is obtained at the start of each horizontal line of the video signal appearing at the output of the fine corrector delay line 18. It is this last stabilizing operation, however, which causes color editing troubles.

Videotape recorders in current use synchronize to the nearest frame, and thus have a 50–50 chance of locking to the correct color frame. If, as shown in FIG. 3, the VTR locks to color Frame 1 and the reference sync generator is generating color Frame 1, there is no problem; reproduced sync will be steady at a fixed time behind the reference sync. If, however, the VTR has locked up on color Frame 2, as illustrated in FIG. 4, the burst will be 180° out of phase with the reference subcarrier, and delay line 18 will move the composite signal, including the sync, 180° (140 nanoseconds) ahead or behind the proper timing position, as shown in FIG. 5. In other words, the fine correction places the color subcarrier in proper phase, but it introduces a 140 nanosecond error in the horizontal timing.

For ordinary, uninterrupted replay the above-described action presents no problem, but if a new scene which is properly locked to the reference color sync generator is to be edited onto the tape being played back, or if the reproduced signal is to be mixed or integrated with other material, a serious problem exists. As the reproducing head moves from the original recording to the new recording during replay of the edited tape, it encounters a 180° phase shift of burst with respect to sync on the recorded signal at the edit point, whereupon the fine corrector delay line 18 inserts or removes 140 nanoseconds of delay at the edit point, causing the picture on the face of the screen to jump sideways. If the edit is an isolated one, the effect is not too objectionable since at such an isolated splice the scene content would usually change, and a sideways jump of the picture would be unnoticed. However, a series of closely spaced splices causes rapid hopping about of the picture, particularly on animation sequences when scene background content does not vary, and is very objectionable to the eye. In some cases the drum and capstan servos of the VTR may actually be upset, and at worst there may be complete breakup of the reproduced picture.

The problem outlined above is a long-standing one, being similarly described in an article by C.A. Anderson entitled "The Problems Of Splicing And Editing Color Video Magnetic Tape" which appeared in *IEEE Transactions On Broadcasting*, BC-15, No. 3, September 1969. The author suggests, but does not explore in any depth, several approaches toward solution, but acknowledges that none of them are satisfactory. For example, he suggests the use of 15 p.p.s. frame pulses instead of the 30 p.p.s. pulses currently used on the control track; this refers, of course, to use of frame pulses at one-fourth the basic field repetition rate of NTSC signals, and the earlier-mentioned ratio between the scanning frequency and the color subcarrier frequency which requires the occurrence of four television fields before the unmodulated subcarrier exactly repeats itself in phase. Anderson acknowledges that although this approach has merit it has several restrictions, the most obvious of which would be an approximately 20 percent increase in lock-up time. Also, some editors of video magnetic tape would like to be able, for artistic reasons, to splice to the exact frame—not to every other frame—as would be the case if 15 p.p.s. frame pulses were used.

Although it has already been mentioned, it may be well to emphasize an aspect of the problem related to, but not necessarily identical with, the splicing problem; namely, the so-called "random lock-up" of the VTR. When the VTR is turned on, it locks to the horizontal, vertical and subcarrier timing of the local plant, and there is an equal liklihood of a Frame 1 from the videotape machine being in synchronism with Frame 1 of the plant as it is being synchronous with Frame 2 of the plant. If the machine locks up to the wrong frame, that is, if Frame 1 from the tape is coincident with Frame 2 of the plant, the correction apparatus of FIG. 2 because the reproduced signal is 180° away from the plant signal, will shift the reproduced signal, including the horizontal and vertical synchronizing pulses, by 140 nanoseconds. In other words, the subcarrier signal will be in phase with the plant signal, but the horizontal synchronization pulses will be displaced 140 nanoseconds. Thus, the problems are interrelated: when two tapes are spliced there is the problem of getting them in consecutive flow, and the "random lock-up" problem when the edited tape is to be combined with other signals or used in other plants. In both cases there can be wrong frame coincidence, which is corrected by the correcting system of FIG. 2, but at the expense of introducing the 140 nanoseconds horizontal error. It is the object of the present invention to overcome the above-described deficiencies of currently available videotape machines by causing the machine to always lock up to the proper color frame.

SUMMARY OF THE INVENTION

Briefly, this and related other objects are attained by a modification of existing videotape machines which precludes its locking-up on Frame 1, for example, when the rest of the plant is at Frame 2. Basically, the modification allows the videotape machine to lockup randomly and provides for examination of the error voltage produced by the color burst phase comparator to determine whether it has locked to the proper frame. If the lock-up is proper, no corrective action is taken and the machine is permitted to operate normally; however, if the error voltage indicates lockup to the wrong frame, an electrical signal is generated which causes the tape drive motor momentarily to speed up thereby to physically move the magnetic tape ahead by a distance corresponding to approximately one frame. Correction to within one frame is sufficient inasmuch as the fine phase correction system of the VTR will correct for small errors once the appropriate two frames are approximately in phase.

It is essential to the successful operation of the system that certain parameters of the conventional videotape machine are either immobilized or standardized during the lock-up process. Although the period from startup of the machine to final lock-up is increased slightly—about 5 seconds are required for the complete cycle of operations—it represents a favorable compromise for the assurance that the VTR always locks up to the proper color frame.

DESCRIPTION OF THE DRAWINGS

Other objects and features of the invention will become apparent, and its construction and operation better understood, from the following detailed description taken in conjunction with the accompanying drawings, in which.

DESCRIPTION OF THE PREFERRED EMBODIMENT

Figure 1:
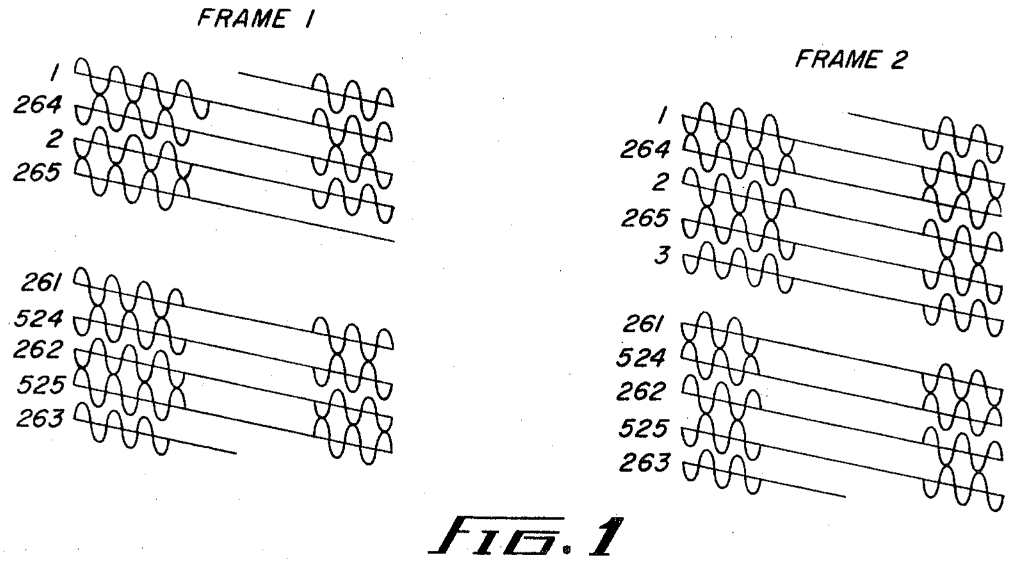
FIG. 1 is a sketch of a color television raster to which reference has already been made in discussing the background of the invention.
Figure 3:
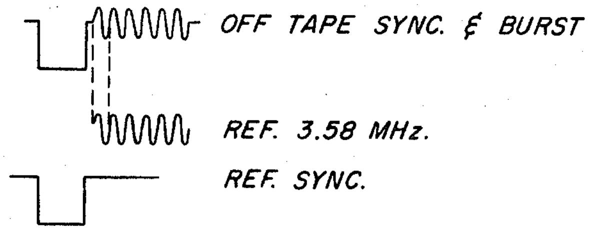
FIGS. 3–5, to which reference has already been made, are a series of waveforms illustrating the nature of the problem solved by the present invention.
Figure 4:
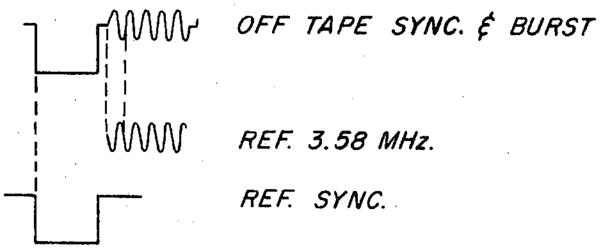
Figure 5:
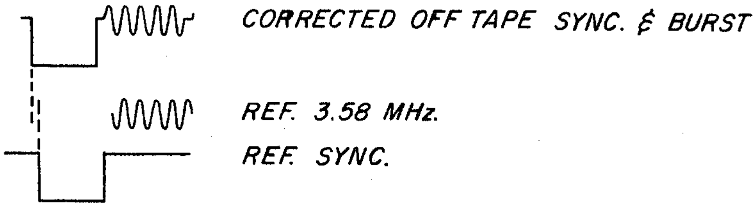
Figure 2:
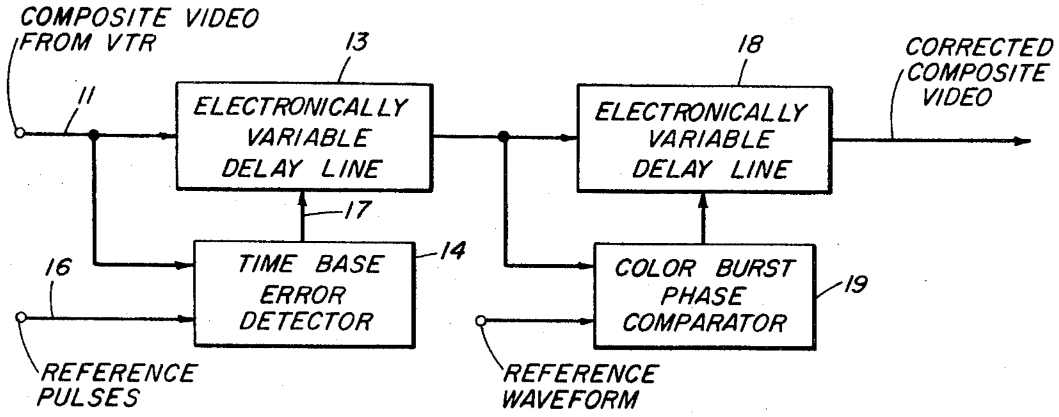
FIG. 2 is a block diagram of coarse and fine electronic correctors typically used with currently available videotape machines, to which previous reference has also been made.

Although the invention has applicability to systems for processing any reproduced signals which contain bursts representing phase information, it is particularly useful in connection with color television signal reproducers of the type described above. Currently used systems for color television signal storage and reproduction use transverse track scanning of a relatively wide magnetic tape with multiple heads, such a system being illustrated in schematic form in FIG. 6. The system conventially includes a head drum having multiple heads that scan transversely across the tape, with each head on the drum sweeping along a different transverse track. During playback, the signal information is reproduced by the different heads successively, so as to reconstitute the original composite color television signal. In the interest of simplicity of illustration, only the elements concerned with signal reproduction have been shown in FIG. 6, and it is assumed that the signal which is to be reproduced is the standard NTCS color television signal.

The tape transport mechanism includes a supply reel 20 and a take-up reel 22, between which a tape 24 is carried past a scanning zone within which signal reproduction (and prior recording) is effected by a head drum 26 and a female guide 28 which engages the tape. A tachometer is provided to indicate speed variations that occur in the head drum during recording to provide an indication of the time base during signal reproduction. The width of the tape 24 is guided about the head drum so as to be held in contact with the rotating heads by a guide mechanism 28. A drum drive motor 30 rotates the head drum at a nominal rate during recording, and at a controlled rate during signal reproduction. Longitudinal movement of the tape 24 between the reels 20 and 22 is effected by a drive capstan 32, which drives the tape as it is urged against the capstan by means of a rotatable pinch roller 34 in conventional fashion. The capstan 32 is driven by a capstan drive motor 36, the speed of which is controlled by a capstan servo 38.

During recording, a timing signal is recorded on the tape 24 by a separate recording head disposed adjacent to the edge of the tape. On playback, a magnetic pickup head 40 positioned along this edge of the tape reproduces these timing signals for control of the capstan speed by servo control system 38. Also, timing information is derived by means of conductor 42 from the tachometer for controlling the angular speed and phase of the rotary head drum by means of a drum servo control system 44.

Four magnetic heads are used in this type of system, and at least one of them is reproducing signals at any given time. The signals from the four heads are fed to switching circuits 46 which are operated synchronously with the head drum to recombine the signals into a single channel so as to reconstitute the composite television signal. Thereafter, the signals are passed through demodulator and signal processing circuits 48 which reform the original signal.

As outlined above, correction of subcarrier phase errors is accomplished by applying the signal from the demodulator and processing amplifier to a voltage variable delay line 13, the delay of which is electronically controlled to vary the phase of the input video signal in compensatory relation to an error voltage. The error signal is developed by removing the sync from the video signal with a suitable sync stripper 50 and comparing it in a phase comparator 52 to reference horizontal synchronizing pulses 16 originally derived from the television plant. These reference pulses are applied to the phase comparator through a number of position control circuits, inclding circuit 54, provided with a manual adjustment 54a, for precisely setting the phase of the reference pulses.

The compensated output of delay line 13 is then applied to the input of a second electronically variable delay line 18. The burst is stripped from the video signal at the output of delay line 13 by a suitable burst stripper 56 and its phase compared in a phase comparator 19 with that of a reference 3.58 MHz subcarrier, also derived from the local television plant. The reference subcarrier is applied to the phase comparator 19 through a phase adjusting circuit 58 having a manual control 58*a* to permit precise adjustment of the phase of the reference subcarrier. The phase comparator 19 is effective to develop an output error voltage proportional to departures in the phase of the color burst of the video signal from that of the reference subcarrier. The error voltage is, in turn, applied to a control input of the delay line 18 to vary the phase of the video signal passing through the line in compensatory relation to the phase departures of the color burst. As a result, substantially exact compensation of color phase error is obtained at the start of each horizontal line of the video signal appearing at the output of the fine corrector delay line 18. The output signal is applied to processing amplifiers 60 of known construction which produce corrected composite video signal at one of its output temrinals. The processing amplifier 60 also delivers a composite tape sync signal which is applied as one of the inputs to drum servo 44 for controlling the speed of the drum drive motor. The error voltage developed by error detector 19 is also applied to drum servo 44 through a pulse position control circuit 62 and through position control circuit 64. The reference horizontal pulses 16 are also applied to the pulse position control circuit 62. Thus, the operation of the drum servo is based on composite reference sync, but since the horizontal and vertical sync pulses of a Frame 1 and the horizontal and vertical sync pulses of a Frame 2 are identical, the frame to which the drum servo causes the drum to lock is a matter of pure random chance.

Figure 6:
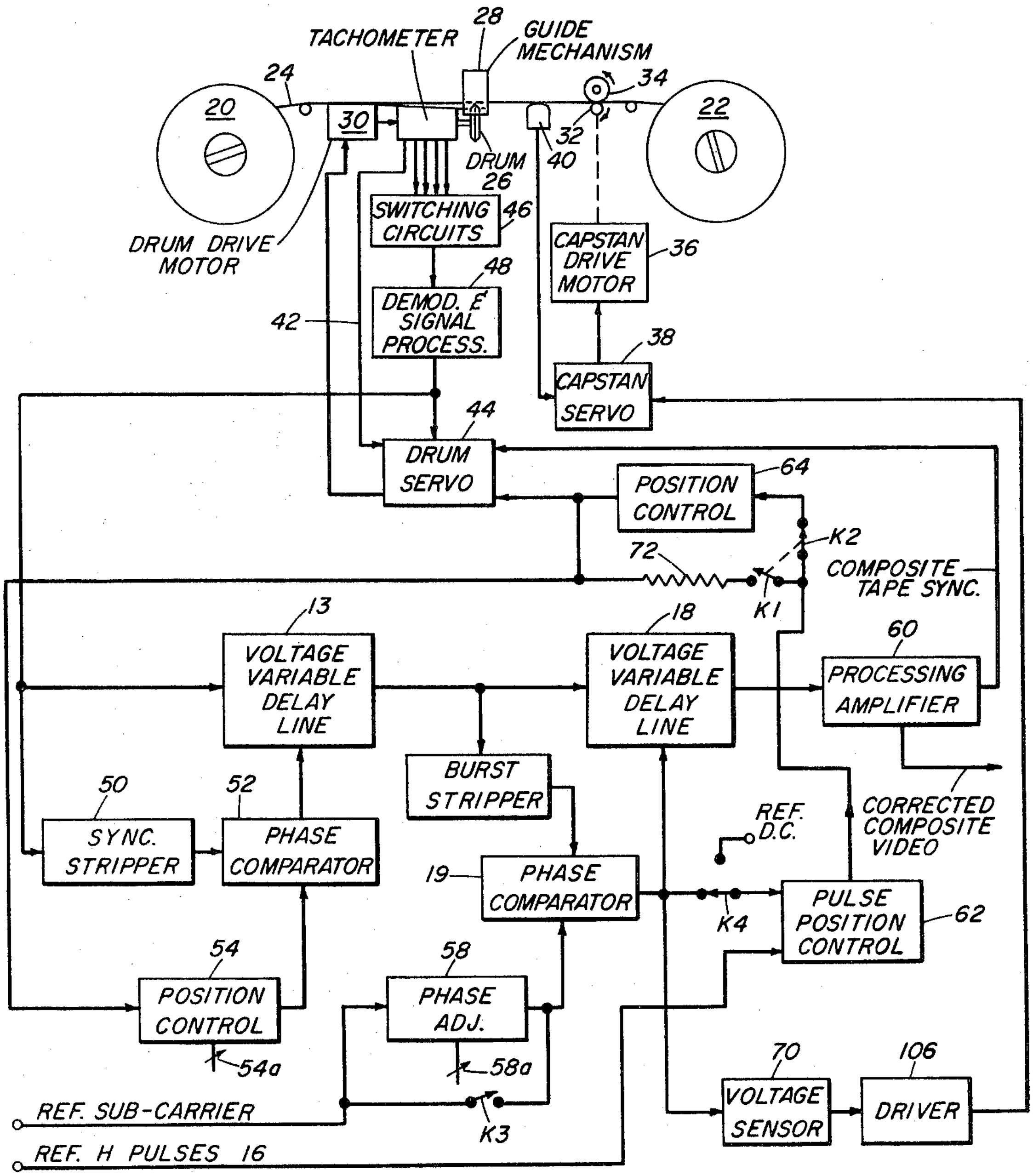
FIG. 6 is a schematic representation and block diagram of a magnetic tape signal processing machine embodying the invention.

In accordance with the present invention, it is desired to effect precise color frame lock of NTSC color television signals reproduced from magnetic tape with a system of the type illustrated in FIG. 6. This is accomplished by sensing the error signal developed by phase comparator 19 with a suitable voltage sensor 70, the error voltage having one value if the system is locked up to the wrong color frame and a different value if the system is locked to the correct color frame. If the error voltage has a value representing a 180° phase error, the voltage sensor and its associated circuitry (to be described) generates and applies a signal to capstan servo 38 which momentarily increases the speed of the capstan drive motor to move the tape 24 forward approximately one-half inch thereby to bring the next video frame into the scanning region. It will be understood that the normal longitudinal movement of the tape is so related to the rrte of rotation of drum 26 that a color frame occupies approximately one-half inch of the length of the tape. On the other hand, if the voltage sensor determines that the playback system is locked to the proper color frame, there is no correction of the capstan drive motor speed, and the system functions normally.

Color frame sensing at 15 p.p.s. is achieved in the automatic mode of the system of FIG. 6 by modifying the performance of the coarse and fine corrector circuits during initial lockup of the playback system. To establish conditions in a system for sensing whether initial lockup is correct or incorrect, the pulse position control circuit 62, to which the reference horizontal pulses 16 are applied, and whose normal function is to allow the fine phase corrector to work in the center of its range so as to have maximum capability for correction, is disabled and set to have a fixed delay during initial lockup. This is done in order to prevent the correction of horizontal error during initial lockup, for otherwise meaningful measurement of the error voltage could not be made. This is accomplished by removing the error voltage from phase comparator 19 from the input to pulse position control circuit 62 and substituting a fixed D.C. voltage representative of a fixed delay by operation of a switch K4, which may be a contactor of a relay.

A further modification necessary to achieve standard conditions is to remove the position control 64 from the circuit to the drum servo and to replace it with a fixed horizontal phase control element, which may be a resistor 72 of predetermined value. Normally, position control 64 may be manually adjusted to a desired value, but for the present framing circuitry to function properly, this element should have a fixed value regardless of the setting to which position control 64 may have been previously adjusted. As schematically illustrated, the fixed servo resistor 72 is substituted for position control 65 by a suitable relay the contacts K1 and K2 of which upon energization, respectively connect resistor 72 in circuit and disconnect position control 65. A third modification of the VTR playback system consists of by-passing the color phase variable delay line, namely the phase adjust circuit 58, for approximately 5 seconds of initial lockup time. This being another operator-controllable element which would normally be set by an opertor for a specific operating condition, is by-passed so as to provide a constant condition for initial lockup comparison independently of how the phase adjust circuit may have been set by an operator. This circuit is by-passed by a switch which is open during normal operation, and which may be a fourth contactor K3 of the aforementioned relay.

With a fixed delay in pulse position control circuit 62, and with a fixed servo horizontal phase reference delay signal, which is applied to position control 54 and thence to the phase comparator 52 of the coarse correcting circuit, the coarse correcting circuit will always align the leading edge of the tape playback signal in the same position relative to the fixed plant horizontal reference signal. Because the reference subcarrier phase applied to error detector 19 is also fixed by removing the "color-phase" variable delay line 58, the error voltage from phase comparator 19 becomes proportional to the relative phase of its burst signal to the plant subcarrier reference signal. The system is calibrated so that if the error voltage from comparator 19 is more negative than the value representing a 90° phase difference, the VTR remains in the initial frame lock, and if the voltage is less negative than that value, the voltage sensor and its associated circuitry generates a signal to speed up the capstan sufficiently to move the tape ahead to the next video frame.

Figure 7:
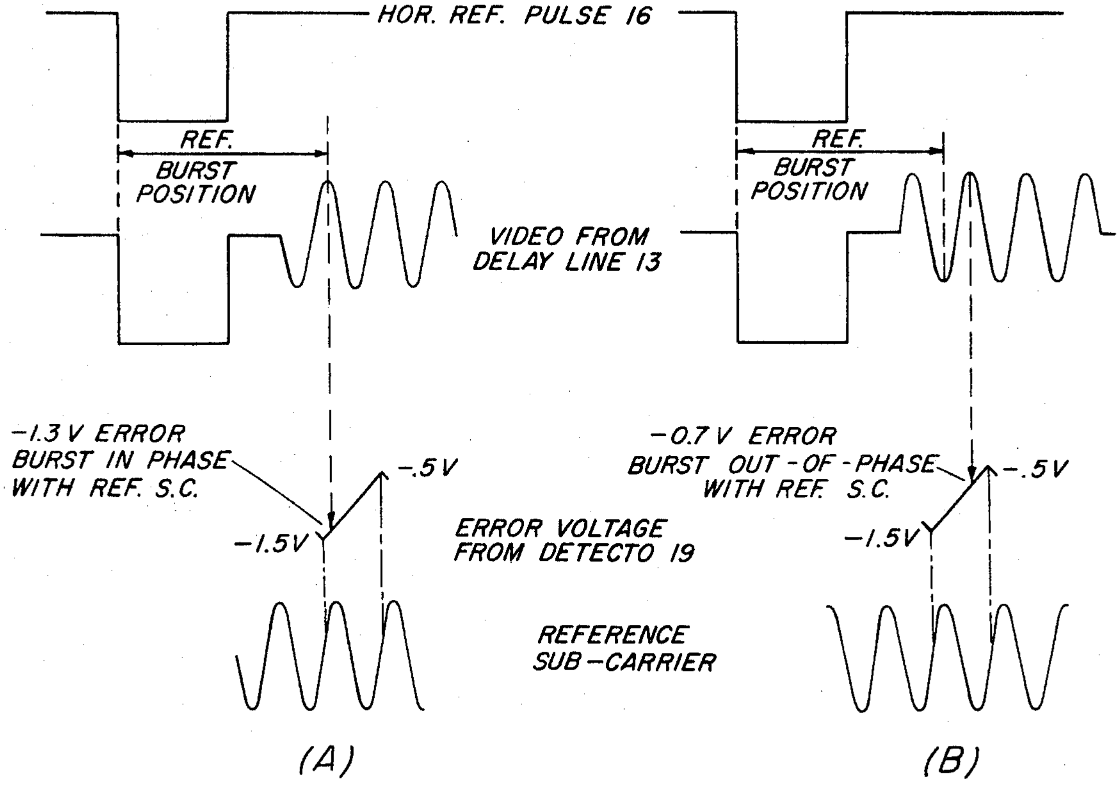
FIGS. 7A and 7B are timing waveforms illustrating conditions when the playback has locked to the correct and incorrect color frame, respectively.

FIGS. 7A and 7B show the horizontal reference pulse and subcarrier timing relationships that exist during the initial lockup stage of a calibrated system. The timing adjustment resistor 72 for the reference pulse applied to the coarse corrector is switched into the circuit during initial lockup. Its value is not critical inasmuch as it is a coarse position control; the fine position control is accomplished by adjustment of position control circuit 54, the range of which is designed to approximately three cycles of subcarrier. FIG. 7A is a diagram showing the timing waveform where the playback has locked to the correct color frame. The leading edge of the reproduced sync (that is, the video signal from delay line 13) is aligned with a fixed offset to the reference horizontal pulse and the burst signal is in phase with the reference subcarrier. The phase comparator 19 is operative in response to application of the burst signal to one of its terminals and application of the reference subcarrier to the other to produce an error voltage which may typically have a value in the range between −0.5 volts and −1.5 volts. When the burst and reference subcarrier are in phase, the error voltage is approximately −1.3 volts, which will be seen from the discussion to follow, is a value that inhibits reframing. In other words, with an error voltage in the range of approximately −1.0 to −1.5 volts, the voltage sensor 70 is inoperative to speed up the tape and the VTR is allowed to function normally.

On the other hand, when the VTR playback initially locks to the incorrect color frame, as illustrated in FIG. 7B, the leading edge of playback sync and the reference horizontal pulse are again in the same relative alignment, but the burst phase is 180° out-of-phase with respect to the reference subcarrier. Under these conditions, the error voltage from phase comparator 19 is approximately −0.7 volts. This value of error voltage activates the voltage sensor which, in turn, initiates generation of a signal to momentarily cause the video tape transport to speed up and move the tape 24 to the next video frame, which is now the correct color frame. Since, as was noted earlier, the color burst is compared with the reference subcarrier on a line-by-line basis, an error signal proportional to the timing error in the video from delay line 13 is always present.

Figure 8:
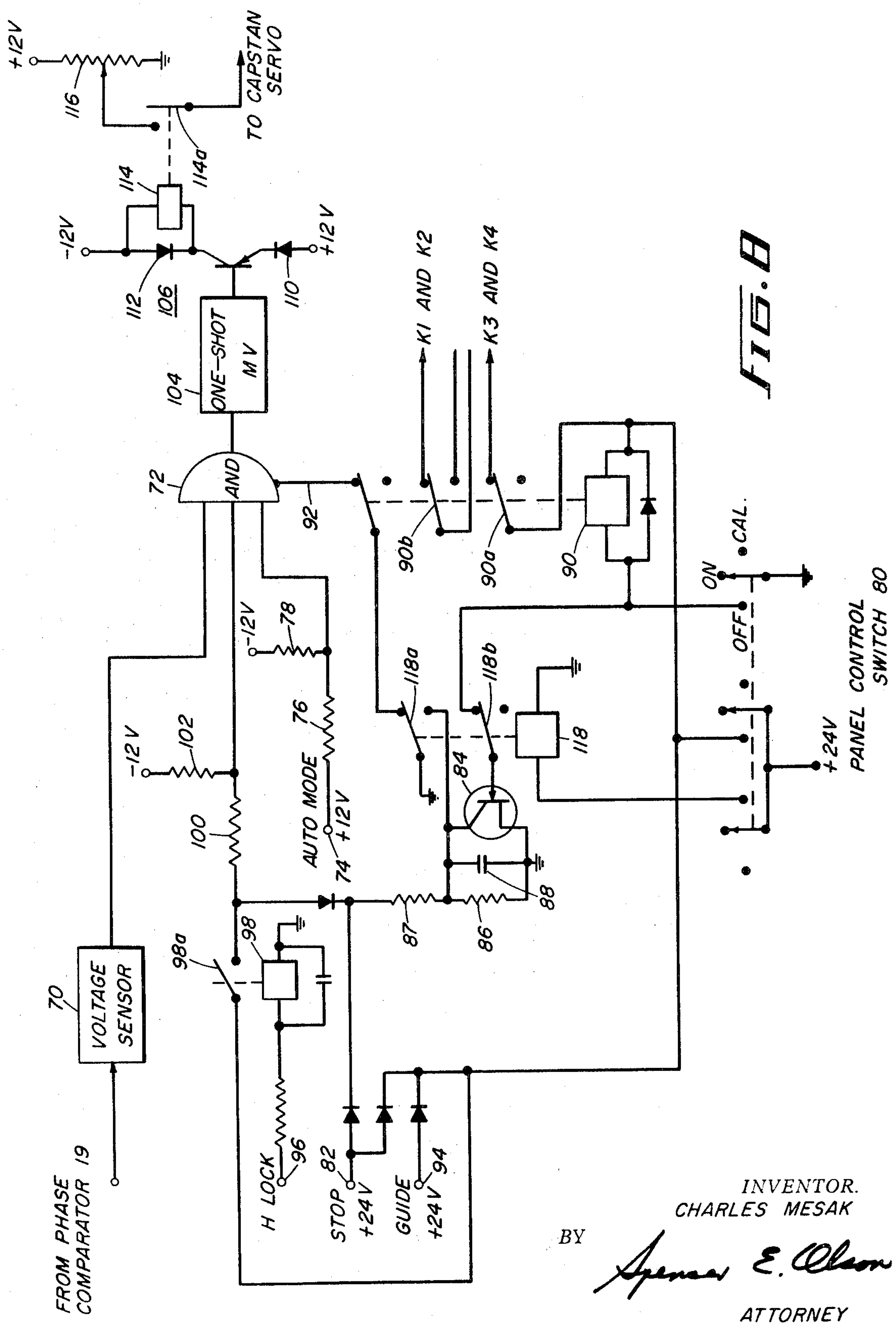
FIG. 8 is a schematic diagram of a circuit for developing a voltage signal for speeding up the magnetic tape drive when the playback has locked to the incorrect color frame.

FIG. 8 shows a suitable circuit for applying a frame lock signal to the capstan servo 38, in the event correction is necessary. The error signal from phase comparator 19 is applied to a voltage sensor 70, the sensitivity of which is set at a point midway between the error voltage representing the correct and incorrect initial color frame lockup, namely, at about −1.0 volt. If the voltage applied to the sensor is more negative than −1.0 volt, there is no output from the voltage sensor; on the other hand, if the error voltage is less negative than −1.0 volt, the sensor produces an output signal of predetermined value which is applied as one input to an AND gate 72. To insure that all other operating conditions of the VTR are appropriate for application of a correction signal to the capstan servo, there are two other inputs and a ground connection to the AND gate, all of which must be present along with a signal from voltage sensor 70, before the correction signal can be applied to the capstan servo. One of these inputs, labeled "AUTO MODE," is to insure that the AND gate passes a control signal only when the tape playback machine is operating in the automatic mode, since the frame-lock system of the present invention functions correctly only when the VTR is operating in this mode. When the machine is in the automatic mode, a +12 volts signal is present at terminal 74, and the voltage divider consisting of resistors 76 and 78 connected between terminal 74 and a source of potential having a value of −12 volts, provides proper DC enabling signal for appliction to the gate.

The functions of the other AND gate connections will be best understood by briefly describing the remainder of the illustrated circuit in terms of the operating sequence of the playback machine. As illustrated, all switches and relay contacts are in the positions they assume immediately following closure of the "ON" contacts of the panel control switch 80 of the playback machine. When the VTR itself is stopped a +24 volt signal, signifying that the machine is in the "stop" condition, is applied to terminal 82, causing an SCR 84 (having a timing network consisting of resistors 86 and 87 and capacitor 88) to be conducting, thereby to energize a relay 90, one terminal of the coil of which is returned to ground through the SCR as well as the "OFF" terminal of the switch 80. With relay 90 energized, the contacts thereof are in the position opposite to that illustrated, with the consequence that there is no connection 92 to the AND gate and therefore it is disabled.

When the panel control switch 80 is in the calibrate (CAL) position, the device is locked in the proper operating state for setup and maintenance. When switch 80 is set to CAL, a relay 118 is energized and contacts 118*a* thereof disable AND gate 72 by removing the ground connection 92 and prevents the voltage sensor output from reaching the capstan servo even if all of the other conditions are met. These contacts also prevent SCR 84 from firing. Contacts 118*b* prevents energization of relay 90 in the calibrate mode.

When the VTR "play" switch is turned "on", the energizing circuit path for relay 90 is opened, because the SCR is turned off. Next, the guide mechanism 28 (FIG. 6) closes, this condition being indicated by a +24 volt signal, which is applied to terminal 94. This potential is applied to one terminal of relay 90, but since the ground return has been removed, and the SCR 84 turned off, relay 90 is not energized at this stage of the sequence of operations. With the relay 90 de-energized, the closed contact 90a causes the contact K3 (FIG. 6) to close so as to by-pass phase adjust circuit 58, and the closed contact 90b causes contactors K1 and K2 to close and open, respectively, to insert a fixed position control, represented by resistor 72, in place of position control 65.

Following closure of guide 28, the machine attempts to lock up, and characteristic of machines of this type, achieves horizontal lock between the tape signals and the reference horizontal pulses after about 2 ½ seconds. At this time a "horizontal lock light" on the panel of the playback machine goes on, the energizing signal for the light also being applied to terminal 96 labeled "H LOCK". Approximately one-half second after the horizontal lock light goes on, the H-lock relay 98 operates to close its contact 98*a* thereby to apply the +24 volt potential at terminal 94 to one end of a voltage divider consisting of resistors 100 and 102, the other end of which is connected to a potential source having a value of −12 volts, to develop a suitable enabling signal for application to the remaining input of AND gate 72. Thus, the H-LOCK input to the AND gate will now enable the gate to permit an output from voltage sensor 70 indicative of incorrect initial frame lock to pass through the gate.

When the initial lockup is in the incorrect color phase, and the other enabling inputs to AND gate 72 are present, an output voltage is produced which triggers a one-shot multivibrator 104, which includes known means for adjusting the period of its output pulse. The pulse from the multivibrator is applied to a speed relay driver 106, which may comprise a transistor 108 having its emitter electrode connected through a diode 110 to a source of +12 volts, and its collector connected through a diode 112 to a −12 volts source. The coil of a relay 114 is connected across diode 112 and is energized for the duration of the pulse from the multivibrator applied to the base electrode of the transistor to thereby momentarily close its contact 114*a* and make connection to the tap of a potentiometer 116 connected between a source of positive potential and ground, thereby to develop a DC error signal for application to the capstan servo 38. This voltage is applied to the capstan servo at the same point that the manual speed change is normally applied, namely to the oscillator in the capstan servo, to increase its frequency and thereby speed up the capstan drive motor 36. The duration of the pulse from multivibrator 104 and the amplitude of the speed change voltage are adjusted to values such that the tape is moved forward approximately one-half inch which, as was noted earlier, corresponds approximately to one monochrome frame on the tape. The voltage is applied just long enough to move the video tape into the area of proper framing, that is, the next color frame, and then removed; that is, the voltage is applied only for the duration of the pulse from one-shot multivibrator 104. The final framing to the correct color frame is completed by the normal functions of the VTR servo system.

Returning now to the description of the operation of the control circuitry of FIG. 8, it will be recalled that relay 98 operates about one-half second after horizontal lock has been achieved. Upon closure of contact 98*a* the +24 volt DC appearing at terminal 94 is applied to the timing circuit (including resistors 86 and 87 and capacitor 88) of the SCR 84, the timing circuit being designed to cause the SCR to fire approximately 4 seconds following application of the DC voltage signal. When the SCR conducts, relay 90 is energized and restores all circuits controlled thereby (including the relay contacts in the system of FIG. 6) to normal, and since the ground connection to the AND gate 72 is removed, prevents the gate from operating again until the sequence is repeated. Thus, the initial lockup and reframing, if necessary, are accomplished in slightly less than five seconds, with the assurance that lockup has occurred on the correct color frame. It will be evident from the foregoing description that with relatively minor modification of a conventional video tape machine to establish standard conditions for comparison, and examining the error voltage produced by the color burst phase comparator, that the system determines whether the playback machine has initially locked to the correct color frame and, if not, generates a signal for moving the tape ahead, or backward, a distance corresponding approximately to one frame, thereby insuring that the playback system on start up always locks on the correct color frame.

I claim:

1. In combination with a magnetic tape system for initially storing and thereafter reproducing a color television signal including horizontal synchronizing pulses and color subcarrier components having color bursts having a given relative position between the leading edge of the horizontal synchronizing pulses and the color burst phase, and including a coarse time base corrector of the type including a first electronically variable delay line having a signal input receiving a composite color signal reproduced by a plurality of magnetic heads on a servo-controlled rotary head drum successively scanning predetermined transverse tracks of a video tape recording transported past the drum at a predetermined speed by a capstan drive under control of a capstan servo, a signal output, and a control input for varying the phase of the video signal passing between the signal input and output in accordance with a first error signal applied to the control input, said first error signal being proportional to the difference in phase between the horizontal synchronizing pulses of said reproduced video signal and a reference horizontal synchronizing pulse signal, said corrector further including a second electronically variable delay line having a signal input receiving the video signal from the signal output of said first delay line, a signal output and a control input, and a phase comparator for comparing in line-by-line fashion the phase of the color bursts of the reproduced video signal to the phase of a reference subcarrier signal and developing and applying to said control input an error voltage to vary the phase of the reproduced video signal in compensatory relation to the error voltage, said error voltage varying substantially linearly over a range including a first predetermined value when said color burst is in phase with said reference subcarrier and a second different predetermined value when said color burst is 180° out-of-phase with said reference subcarrier, apparatus for causing said tape system to lock to the correct color frame upon startup, said apparatus comprising, means operative to stabilize the position of the reproduced horizontal synchronizing pulses relative to said reference horizontal pulses to enable comparison of the phase of the color burst of the reproduced video signal relative to the reference subcarrier after initial random color frame lockup, voltage sensing means for sensing the value of said error voltage operative to determine the relative phase of the color burst of the reproduced video signal and said reference subcarrier, and means operative in response to displacement of the phase of the color burst of the reproduced video signal relative to said reference subcarrier by a predetermined angle to change the speed of said capstan by an amount sufficient to move said tape by an amount corresponding to one television frame.

2. The combination of claim 1 wherein said capstan servo includes frequency-determining means for controlling the speed of said capstan, and said last-mentioned means includes means for generating and applying a pulse of predetermined amplitude and duration to said frequency-determining means.

3. The combination of claim 2 further including means for inhibiting generation of said pulse unless said tape system is operating in a predetermined mode, and means for disabling said pulse-generating means after a predetermined interval following generation of a pulse.

4. The combination of claim 1 wherein said voltage sensing means is operative to produce an output signal only in response to said error voltage having a value in the range representing a phase displacement in the range between 90° and 180° between the color burst and the reference subcarrier, and wherein said last-mentioned means is operative in response to an output signal from said voltage sensing means to generate and apply a pulse of predetermined amplitude and duration to said capstan servo.

5. The combination of claim 4 further including means for separately adjusting the amplitude and the duration of the pulse applied to said capstan servo.

6. The combination of claim 1 wherein said reference subcarrier is normally applied to said phase comparator through a manually adjustable phase-adjusting circuit, and wherein said means for enabling comparison of the phase of the color burst of the reproduced video signal relative to said reference subcarrier includes means for removing said manually adjustable phase-adjusting circuit from the system during the period of comparison.

7. The combination of claim 6 wherein said refererence horizontal synchronizing pulse signal is normally applied to said coarse time base corrector through a variable horizontal position control and wherein said means for stabilizing the position of the reproduced horizontal synchronizing pulses relative to the reference horizontal synchronizing pulses further includes means operative to switch said variable horizontal position control out of circuit and replace it with a fixed resistor of predetermined value.

8. The combination of claim 7 wherein said error voltage is normally applied through a pulse position control circuit to said variable horizontal normally control and wherein said stabilizin means further includes means operative to remove said error voltage from said pulse position control circuit and substitute therefor a reference D.C. voltage representative of a fixed delay.

9. The combination of claim 8 wherein said means for momentarily increasing the speed of said capstan includes means for generating and applying a pulse of predetermined amplitude and duration to said capstan servo.

10. The combination of claim 9 further including means for separately adjusting the amplitude and duration of the pulse applied to said capstan servo.

11. The combination of claim 10 wherein said voltage sensing means is operative to produce an output signal only in response to an error voltage having a value in the range representing a phase displacement in the range between 90° and 180° between the reproduced color burst and the reference subcarrier.

* * * * *